United States Patent [19]

Barnett et al.

[11] Patent Number: 4,797,983
[45] Date of Patent: Jan. 17, 1989

[54] CONNECTORS FOR INSERT MOULDING IN PANELS

[75] Inventors: Barry R. M. Barnett; David C. Ellis, both of Buckinghamshire, England

[73] Assignee: TRW United-Carr Limited, Inc., Buckinghamshire, England

[21] Appl. No.: 17,522

[22] Filed: Feb. 24, 1987

[30] Foreign Application Priority Data

Feb. 25, 1986 [GB] United Kingdom ............... 8604595
Jul. 29, 1986 [GB] United Kingdom ............... 8618406

[51] Int. Cl.⁴ ...................... E04B 1/38; B62D 27/04
[52] U.S. Cl. ...................... 24/289; 24/293; 24/297
[58] Field of Search ................ 24/289, 293, 297, 453

[56] References Cited

U.S. PATENT DOCUMENTS

| | | | |
|---|---|---|---|
| 3,213,506 | 10/1965 | Fernberg | 24/289 |
| 3,230,592 | 1/1966 | Hosea | 24/297 |
| 3,239,988 | 3/1966 | Meyer | 24/297 |
| 3,379,465 | 4/1968 | Raymond | 24/289 |
| 3,897,967 | 8/1975 | Barenyi | 24/297 |
| 4,011,635 | 3/1977 | Meyer | 24/293 |
| 4,424,612 | 1/1984 | Muller et al. | 24/289 |
| 4,472,918 | 9/1984 | Mach | 24/289 |
| 4,506,419 | 3/1985 | Mitomi | 24/289 |
| 4,529,244 | 7/1985 | Baydel | 24/289 |
| 4,564,163 | 1/1986 | Barnett | 24/297 |

FOREIGN PATENT DOCUMENTS

| | | | |
|---|---|---|---|
| 0185892 | 7/1986 | European Pat. Off. | 24/289 |
| 1384385 | 11/1964 | France | 24/297 |
| 0191851 | 9/1985 | Japan | 24/289 |
| 0418735 | 2/1967 | Switzerland | 24/297 |

Primary Examiner—Victor N. Sakran
Attorney, Agent, or Firm—Fay, Sharpe, Beall, Fagan, Minnich & McKee

[57] ABSTRACT

A connector is inserted moulded into a panel and a fitting adapted to support, or attach an item to the panel interengages the connector. In one embodiment the connector is a plastics socket connector which comprises a hollow boss having a substantially flat end wall and a continuous side wall, a slot in the end wall, a raised membrane of material overyling and closing the slot and a closure shaped and adapted to be press fitted into the hollow boss to close the end of the boss opposite to the end wall. In this embodiment the slot is keyhole-shaped and receives a head of a headed stud.

14 Claims, 4 Drawing Sheets

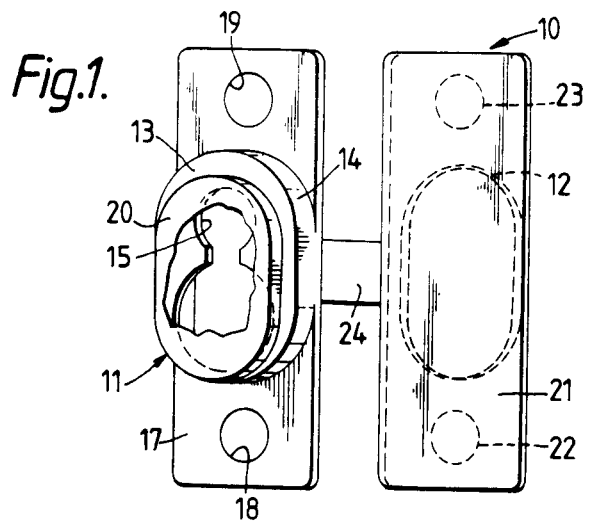
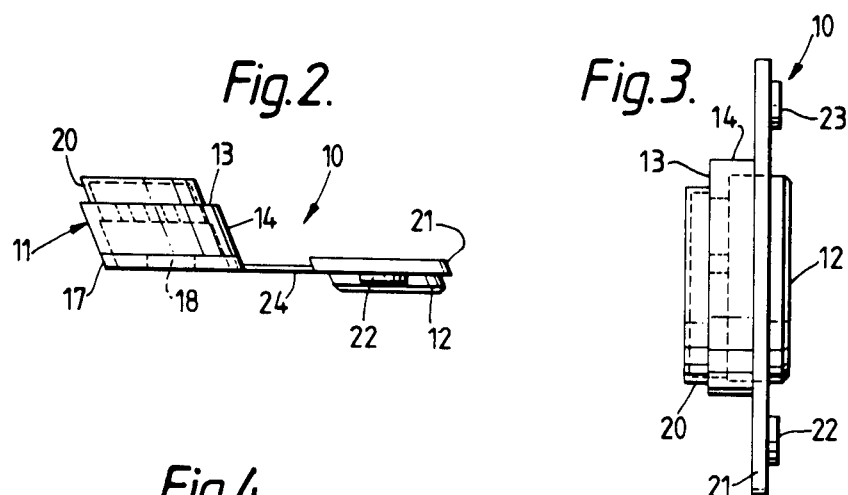
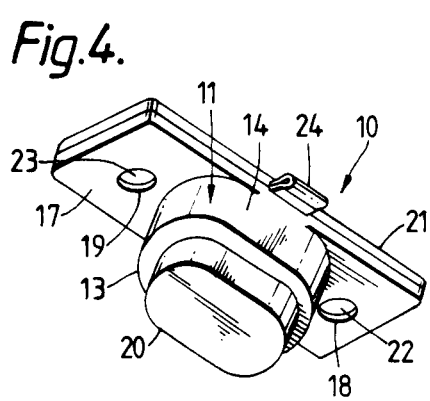

CONNECTORS FOR INSERT MOULDING IN PANELS

The present invention is concerned with connectors, and particularly but not exclusively to moulded plastics connectors which are adapted to be insert moulded within a vehicle panel and to receive a stud used to fix the panel in position.

It is common practice in the automotive industry to attach a vehicle trim panel to the body of the vehicle by forming a plurality of keyhole slots in the trim panel, attaching a headed stud in each of the keyhole slots in the panel and then snap-engaging the shanks of the studs into receiving apertures in the vehicle body to secure the panel to the vehicle body. In an alternative arrangement the shank of each stud may be snap-engaged into a grommet mounted in the receiving aperture in the vehicle body.

Hitherto, it has been the practice to form the keyhole slots in the panel itself. However, this has the disadvantage that the heads of the studs can be seen on the outer surface of the panel. It has also been proposed to attach stud connectors, each of which incorporates a keyhole slot, on the inside surface of the panel by adhesive or rivets. However, this arrangement has the disadvantage that the panel is separated from the supporting bodywork by the thickness of the connector and does not lie flat against the supporting bodywork of the vehicle.

The present invention provides in one aspect a panel having a fitting used to support the panel or to attach an item to the panel, the fitting being attached to the panel by its inter-engagement with a connector insert moulded into the panel. The invention also extends to a connector for such an arrangement, and to a fitting for such an arrangement.

The panel may be a vehicle trim panel, and the fitting, which may be a stud, could be used to support the panel on a vehicle.

The connector preferably has a wall which has one surface which in use is substantially flush with an outer surface of the panel. This wall preferably engages the stud when the latter is attached to the connector.

The fitting and the connector are preferably interconnected by means of the engagement of a projecting portion of one of the items into an aperture, preferably a keyhole slot, of the other item. One of the embodiments disclosed below includes a connector having the keyhole slot formed in a boss thereof for receiving the head of a stud. Another of the embodiments described below incorporates a connector which, when moulded in the panel, has a headed portion projecting outwardly from the panel for engagement within an aperture formed in the head of a stud.

The stud preferably has a part which is structurally weaker than the part of the connector to which it is fitted, so that in the event of breakage it is merely necessary to replace the stud rather than the connector moulded in the panel.

The stud is preferably rotatable when fitted to the panel to facilitate the mounting operation.

Instead of using the fitting or stud to support the panel on the vehicle, it may be used to retain an item, such as a flexible window seal, on the panel.

The connector preferably has apertures within which the moulded panel material is located so as to retain the connector in the panel more firmly.

According to a specific aspect of the invention, we provide a moulded plastics stud connector for insert moulding in a panel comprising a hollow boss having a substantially flat end wall and a continuous side wall, a slot in the end wall, a membrane of material overlying and closing the slot and a closure shaped and adapted to be press fitted into the hollow boss to close the end of the boss opposite to the end wall.

In accordance with a further feature of the present invention, we provide a vehicle trim panel incorporating at least one connector as defined in the preceding paragraph, the connector being insert moulded within the thickness of the panel with the closure press fitted within the boss, the outer surface of the end wall of the boss flush with the outer surface of the panel and the membrane removed to give access to the slot.

In accordance with yet a further aspect of the invention, we provide a method of manufacturing a vehicle trim panel incorporating one or more connectors as defined above comprising the steps of:

press-fitting the closure into the boss of the or each connector to close the boss insert moulding the or each connector within the panel with the outer surface of the end wall of the boss of the or each connector flush with the surface of the panel and removing the membrane of material from the or each boss to give access to the slot in the end wall.

According to a still further feature of the invention, there is provided a stud connector for a panel, the connector being adapted to be insert moulded within the panel with a headed portion of the connector projecting from the panel, and a stud having a hollow head into which the headed portion of the connector can be fitted in order to attach the stud to the connector. The head of the stud is preferably slotted to facilitate its fitting to the connector.

According to a still further aspect of the invention there is provided a stud for interconnecting two parts, the stud having a first portion, which is preferably a barbed shaft, for fitting to one of the parts and a second portion, which comprises a hollow and preferably slotted head, for receiving and retaining a projection of the other of said parts.

Embodiments of the present invention will now be described with reference to the accompanying drawings, in which:

FIG. 1 is a plan view of a moulded plastic stud connector in accordance with the present invention;

FIG. 2 is a side view of the connector shown in FIG. 1;

FIG. 3 is an end view of the connector shown in FIGS. 1 and 2;

FIG. 4 is a perspective view of the connector showing the two parts locked together;

In FIGS. 1 to 5 of the drawings a moulded plastics stud connector is indicated generally at 10. The connector 10 may be made from any suitable plastics material such as polyethylene and may be made by any suitable method, for instance by injection moulding.

Figure 5:
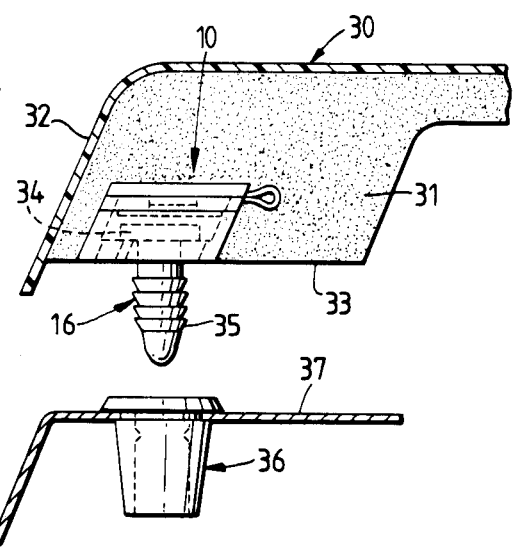
FIG. 5 is a section through a vehicle trim pad incorporating the connector of FIGS. 1 to 3, a stud mounted on the connector and a part of a vehicle body having an aperture and a grommet to receive the stud.
Figure 6:
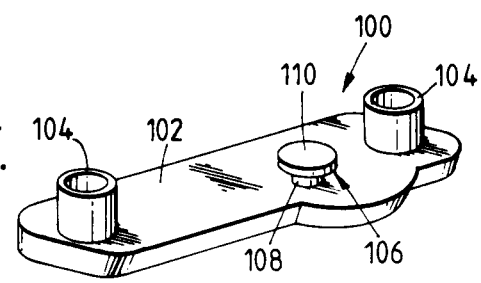
FIG. 6 is a perspective view of a connector of a second embodiment of the invention.

The connector 10 comprises a hollow boss 11 and a closure 12 which is shaped to be a press fit within the open end of the boss 11. The boss 11 has a substantially flat end wall 13 which is generally oval in shape, and a continuous side wall 14. A keyhole shaped slot 15 is formed in the end wall 13 to receive a headed stud 16, as shown in FIG. 5. The boss 11 is moulded integrally with a substantially flat base plate 17, the base plate 17 being provided with apertures 18 and 19 on opposite sides of the boss 11. The slot 15 is covered and closed by a membrane 20 which is approximately 0.2 mm. in thickness. The membrane 20 stands proud of the outer face of the end wall 13 and can be easily removed with the aid of a knife or similar tool.

The closure 12 is complementary in shape to the boss 11 and is also moulded integrally with a base plate 21. The base plate 21 is provided with two projecting rivets 22 and 23 and is joined to the boss 11 by a flexible hinge 24.

As can be seen from FIG. 4, the hinge 24 can be bent so that the closure 12 can be brought up to the open end of the boss 11 and pressed into the boss where it is a snap fit. The boss is then completely closed by the closure. When the closure is pressed fully home, the rivets 22 and 23 enter the apertures 18 and 19 and can then be spread so as to securely lock the two components together.

If desired, the two components could be ultrasonically welded together.

The connector 10 is adapted to be insert moulded within a vehicle trim panel 30 which comprises foam material 31 moulded onto an outer vinyl skin 32. The connector is first closed by press-fitting the closure 12 into the boss 11 and spreading the rivets 22 and 23. The closure is then placed within the panel mould and insert moulded within the foam material 31 so that the outer face of the end wall 13 of the boss is flush with the inner face 33 of the panel. When the connector is placed within the mould, the membrane 20 closes the slot 15 and the other end of the boss is closed by the closure 12. Thus plastics foam material cannot enter and clog the boss during the injection moulding process. When the panel has been moulded and cured, the membrane 20 stands proud of the inner face 33 of the panel and can be readily removed with the aid of a suitable machine or implement to uncover the keyhole slot 15.

The stud 16, which has a head 34 and a barbed shank 35 is then attached to the connector by inserting the head 34 into the larger end of the keyhole slot 15 and sliding it sideways to the narrower end. This type of headed stud and keyhole slot connection is well known.

The shank 35 is then presented to a grommet 36, which is mounted in the vehicle body 37 and forced into the grommet 36 to secure the panel 30 to the vehicle body.

The connector 100 of the second embodiment described with reference to FIGS. 6 to 9 is made of injection moulded plastics material and comprises a wall 102 having at each end a hollow boss 104 and in a central region thereof a projecting headed portion 106. The portion 106 has a relatively narrow cylindrical shaft 108 supporting a relatively large diameter circular head 110, so that the portion 106 is substantially T-shaped in section.

Figure 7:
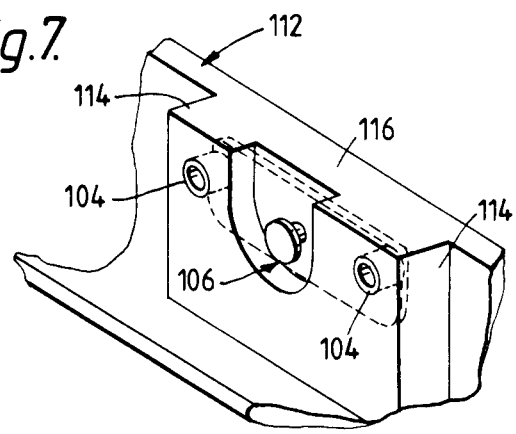
FIG. 7 is a perspective view showing the connector when embedded in a trim panel.

As in the embodiment described above, the connector 100 is, in use, insert moulded within a vehicle trim panel. With reference to FIG. 7, the panel 112 has two relatively thick regions 114 within each of which is located a respective end of the connector 100. The hollow bosses 104 are located on projections within the mould during formation of the trim panel so as to hold the connector in position. A thin portion 116 of the panel 112 is located between the thick sections 114, so that the headed portion 106 of the connector 100 projects outwardly from the surface of this thin section 116. The outer surface of the wall 102 is flush with the outer surface of the thin section 116.

Figure 8:
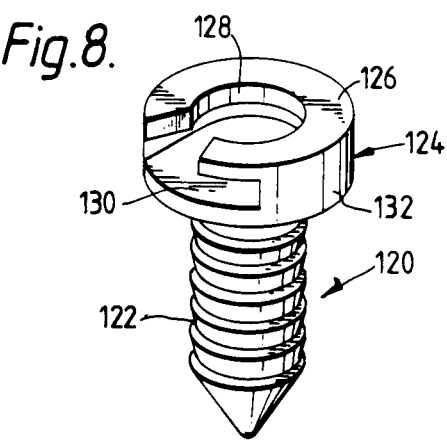
FIG. 8 is a perspective view of a stud of the second embodiment.

With reference to FIG. 8, a stud 120 has a barbed shaft 122 and a hollow cylindrical head 124. The end wall 126 of the head is formed with a keyhole slot 128. This is linked to a circumferential slot 130 in the side wall 132 of the cylindrical head 124. This facilitates flexing of the upper wall 126 of the head portion 124 when the stud is snap-fitted onto the projecting portion 106 of the connector 100 in the manner indicated in FIG. 9.

Figure 9:
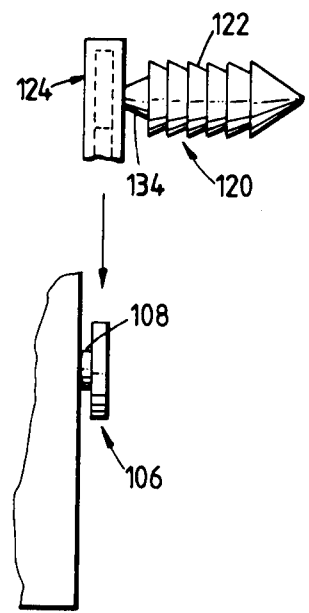
FIG. 9 is a view to illustrate the manner in which the stud of FIG. 8 is attached to the connector of FIGS. 6 and 7.

FIG. 9 also shows that the shaft 122 of the stud 120 is connected to the head 124 thereof, by a narrow tapering neck 134. This is thinner and structurally weaker than the shaft 108 of the projecting portion 106 of the connector 100. Accordingly, it is ensured that excess force applied to the above arrangement during demounting of the panel will cause the stud 120 to break rather than the connector 100, particularly the headed portion 106, or the part of the panel in which it is embedded. The stud 16 of the first embodiment may similarly have a structurally weak portion.

It will be appreciated from the drawings that the stud 120 can be rotated about its axis when it has been fitted to the connector 100. This facilitates the mounting of the panel to the vehicle body.

When the stud has been fitted to the connector, the vehicle panel can then be mounted to a vehicle body 37 as shown in FIG. 5 by forcing the shaft 122 of the stud into a grommet 36 exactly in the manner described above.

It will be appreciated that, in the above embodiments, a plurality of connectors will normally be moulded into a panel and a stud attached to each connector. The panel can then be presented to the vehicle body and the projecting shanks of the studs snap-engaged into grommets mounted on the vehicle body.

The embodiment of the invention shown in FIGS. 10 to 13 of the drawings is intended to permit mounting of an item, in this case a rubber seal, to a vehicle trim panel. However, it would be possible to use the arrangement for supporting the trim panel on a vehicle body. Correspondingly, the embodiments described above could alternatively be used for attaching items to the trim panel.

Figure 10:
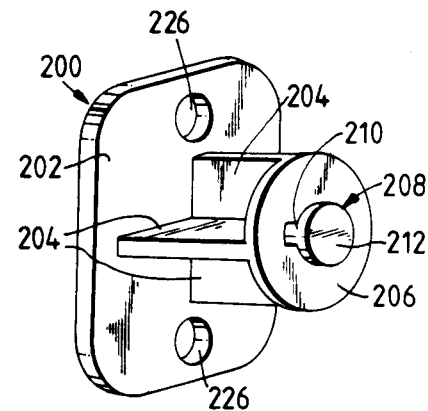
FIG. 10 is a perspective view of a connector of a third embodiment of the invention.

The connector 200 shown in FIG. 10 has a base 202 from which extend, at an angle to the base 202, four flanges 204 arranged at right angles to each other.

These support a circular wall 206, which in turn supports a projecting portion 208 formed of a flat shank 210 and a circular head 212.

Figure 11:
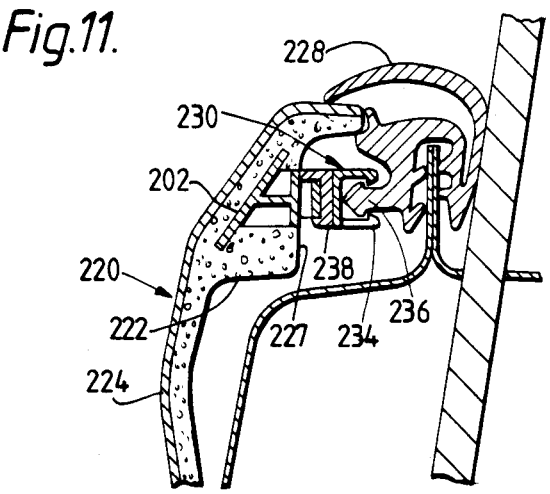
FIG. 11 is a sectional view showing the connector of FIG. 10 in use.
Figure 12:
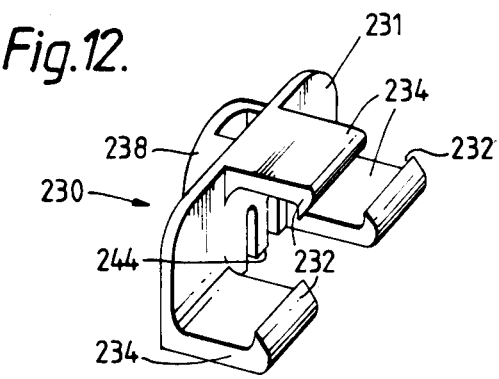
FIG. 12 and 13 are respectively a perspective view and a front elevation of a fitting of the third embodiment.
Figure 13:
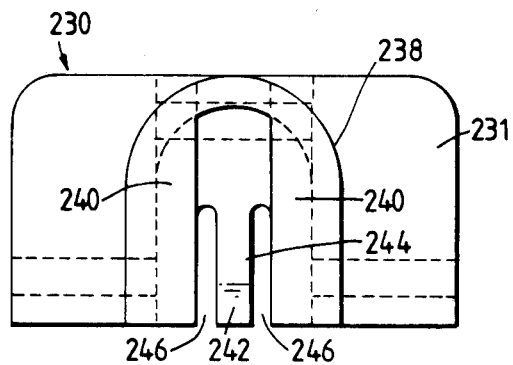

As in the above embodiments, the connector 200 is insert moulded in a panel indicated at 220 in FIG. 11. The panel is formed of polyurethane foam 222 with an outer vinyl layer 224. The base 202 of the connector 200 is formed with apertures 226 which, after the moulding operation, are filled with polyurethane foam so as firmly to retain the connector within the panel.

The outer surface of the wall 206 is flush with a surface 227 of the panel 220.

A rubber seal 228 is attached to the vehicle panel 220 by means of a clip or fitting 230 (see FIGS. 12 and 13) which has a central wall 231 and three extensions 234 projecting from one side thereof between which a headed portion 236 of the rubber seal can be inserted so as to be retained within the fitting by tapered lips 232 of the extensions 234. At the other side of the wall 231 a C-shaped wall 238 defines a recess into which the circular head 212 of the projecting portion 208 can be slid. The head is retained therein by inwardly projecting lips 240 of the wall 238, and by a tapered hook portion 242 of a resilient depending leg 244 produced by the formation of recesses 246 in the wall 231. This leg 244 enables the fitting 230 to be snap-fitted onto the connector 200 and securely held thereon.

We claim:

1. A moulded plastics socket connector for insert moulding in a panel comprising a hollow boss having a substantially flat end wall and a continuous side wall, a slot in the end wall, a raised membrane of material overlying and closing the slot and a closure shaped and adapted to be press-fitted into the hollow boss to close the end of the boss opposite to the end wall.

2. A vehicle trim panel incorporating at least one connector as claimed in claim 1, the connector being moulded within the thickness of the panel with the closure press-fitted within the boss, the outer surface of the end wall of the boss flush with the inner surface of the panel and the membrane removed to give access to the slot.

3. A method of manufacturing a vehicle trim panel incorporating one or more connectors as claimed in claim 1, comprising the steps of
press fitting the closure into the boss of the or each connector to close the boss
injection moulding the or each connector within the panel with the outer surface of the end wall of the boss of the or each connector flush with the inner surface of the panel
removing the membrane from the boss to expose the slot in the end wall.

4. A connector as recited in claim 1 wherein said closure is joined to the boss by a hinge which allows said closure to be moved to said press-fitted position.

5. A connector as recited in claim 4 wherein said connector includes means to securely lock the closure to said boss when said closure is moved to said press-fitted position.

6. A moulded plastics connector insert moulded in a panel, the connector comprising a headed portion projecting from a wall surface of an integral mounting portion of the connector, at least a portion of which wall surface in the area adjacent said headed portion is substantially flush with an outer surface of the panel, and a stud having a hollow head into which the headed portion of the connector is fitted to thereby connect the stud to the connector.

7. A connector as claimed in claim 6, wherein said mounting portion comprises a base, support means extending from the base, and a wall supported on said support means spaced from said base, said headed portion projecting from said wall away from said base.

8. A connector as claimed in claim 7, wherein said support means support said wall at an inclined angle to said base.

9. A connector as claimed in claim 7, wherein said base is formed with apertures adapted to be filled with the panel material during moulding.

10. A fitting attaching a flexible seal to a vehicle panel, said fitting comprising a central wall, extensions projecting from one side of said wall for engaging opposite sides of a portion of the seal for retaining the seal, and recess means provided at the opposite side of said wall and receiving a headed portion of a stud connector insert moulded in the panel, said stud connector having a base portion enclosed in said panel, said base portion having a wall portion from which said stud connector extends with said wall portion being substantially flush with an outer surface of the panel.

11. A moulded plastics socket connector for insert moulding in a panel comprising a hollow boss having a substantiallay flat end wall and a continuous side wall, a slot in the end wall, a raised membrane of material overlying and closing the slot and closure means shaped and adapted to be moved into a sealing position relative to said hollow boss to prevent entry of moulding material into said boss when said connector is insert moulded in a panel.

12. A connector as recited in claim 11 wherein said closure is joined to said boss by a hinge and wherein said closure is generally cup shaped.

13. A fitting attaching a flexible seal to a vehicle panel, said fitting comprising a central wall, extensions projecting from one side of said wall for engaging opposite sides of a portion of the seal for retaining the seal, and recess means provided at the opposite of said wall and receiving a headed portion of a stud connector insert moulded in the panel, two extensions for engaging spaced portions of said seal portion on one side thereof and a further extension for engaging the opposite side of said seal portion at a portion intermediate said spaced portions.

14. A fitting as claimed in claim 13 wherein said extensions have inwardly directed lips.

* * * * *